Aug. 17, 1948.  W. NELSON  2,447,422
CHAIN CLASP
Filed Nov. 21, 1946
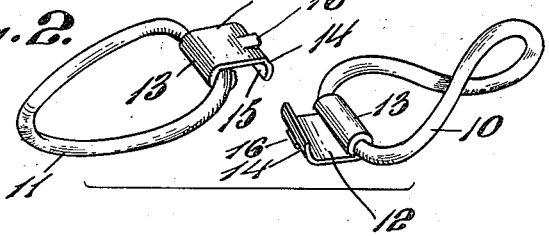
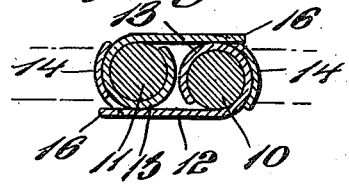
INVENTOR.
William Nelson
BY
Barlow & Barlow
ATTORNEYS.

Patented Aug. 17, 1948

2,447,422

UNITED STATES PATENT OFFICE 2,447,422

CHAIN CLASP

William Nelson, Attleboro, Mass., assignor to J. & L. Tool & Findings Co., Attleboro, Mass., a copartnership Application November 21, 1946, Serial No. 711,365

2 Claims. (Cl. 24—81)

This invention relates to a clasp for a link chain.

Clasps which are usually furnished for connecting together two parts are formed completely and may be assembled with the structure which they are desired to connect without material alteration of the structure. It has, however, been found difficult to connect together certain shapes of chains particularly a curbed or twisted chain because of the shape of the links and because the clasp which is usually furnished is not adaptable for connection therewith and clasps are clumsy when various structures are used for such connection.

An object of this invention is to provide a clasp which will be assembled with the chain by the maker of the chain and will become a part of the chain.

Another object of this invention is to provide a clasp which is in effect a finding or a part supplied to the manufacturer of the chain rather than a completely finished item.

Another object of this invention is to provide a clasp which will be secure when in clasped position.

Another object of this invention is to provide a clasp which will have two parts and each of these will be identical so that tools for the formation thereof may be reduced to a minimum.

Another object of this invention is to provide a clasp which will securely hold the ends of the chain attached when desired and yet permit of their detachment easily when desired.

With these and other objects in view, the invention consists of certain novel features of construction as will be more fully described and particularly pointed out in the appended claims.

In the accompanying drawings:

Fig. 1 is a perspective view showing two links of a chain attached by means of my clasp.

Fig. 2 is a perspective view illustrating the two links of the chain and the clasp parts associated therewith in detached position.

Fig. 3 is a central section view of the showing in Fig. 1.

In proceeding with this invention, I form a strip of stock as a finding which may be simply rolled about each of the chain links which it is desired should be attached. The roll forms the nub or part which will be engaged, while the other end is hook shaped to engage this nub or roll. The proportion as to length is such that some spring action will be necessary in order that these parts may be clasped together; and, thus, they will be held in assembled relation when so clasped.

With reference to the drawings, 10 designates one chain link and 11 another chain link. Each of the clasp parts consists of a shank portion 12 which is a flat piece of sheet stock one end 13 of which is rolled about the link 10, while the other end of this sheet stock 12 is curled as at 14 into somewhat of a hook with an overhanging portion providing a recess 15 as shown. After these parts are assembled on each of the links 10 and 11, it is merely necessary to place the roll 13 of each clasp part in a position so that the hook 14 may snap thereover or have its recess portion fit about the roll 13 and the hook of one will snugly embrace the roll of the other as shown in Fig. 3 to hold the parts in clasped relation. In moving these parts to such relation, there will be a certain outward springing of the stock of the hook as that passes about the roll portion 13 and the stock chosen is such as to have an inherent spring when flexed.

In order that the clasp may be easily released, I cut the stock and raise a finger 16 from the hooked portion 14 so that the thumb nail may be easily placed beneath such raised finger piece and the hook lifted from engagement with roll 13 beneath it; and, thus, the clasp parts may be easily disengaged.

I claim:

1. In combination a pair of chain links, a clasp for separably connecting said links comprising, a pair of members each having one end rolled about one link and the other end bent into hook shape, said roll of one member and the hook thereof resiliently receiving the roll of the other member by the spring of the portions to lock the parts into engaged relation.

2. In combination a pair of chain links, a clasp for separably connecting said links comprising, a pair of members each having one end rolled about one link and the other end bent into hook shape, said roll of one member and the hook thereof resiliently receiving the roll of the other member by the spring of the portions to lock the parts into engaged relation, and a portion of the stock of the hook being raised to provide a finger piece for moving the members apart by drawing the hook of one member over the roll of the other member.

WILLIAM NELSON.

REFERENCES CITED

The following references are of record in the file of this patent:

UNITED STATES PATENTS

| Number | Name | Date |
|---|---|---|
| 1,252,261 | Goubert | Jan. 1, 1918 |
| 1,754,042 | Port | Apr. 8, 1930 |
| 1,784,635 | Kreisler | Dec. 9, 1930 |
| 1,814,077 | Caroling | July 14, 1931 |